Feb. 20, 1968 R. L. PAUL 3,369,702
PRECISION PLANTING DEVICE
Filed Nov. 2, 1966 5 Sheets-Sheet 1
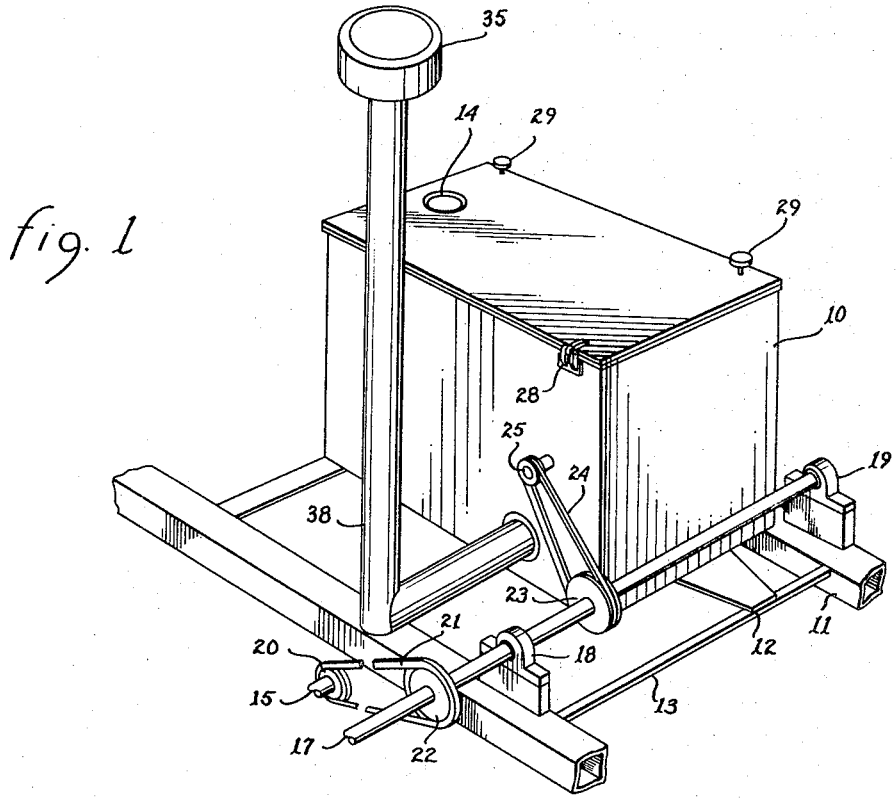
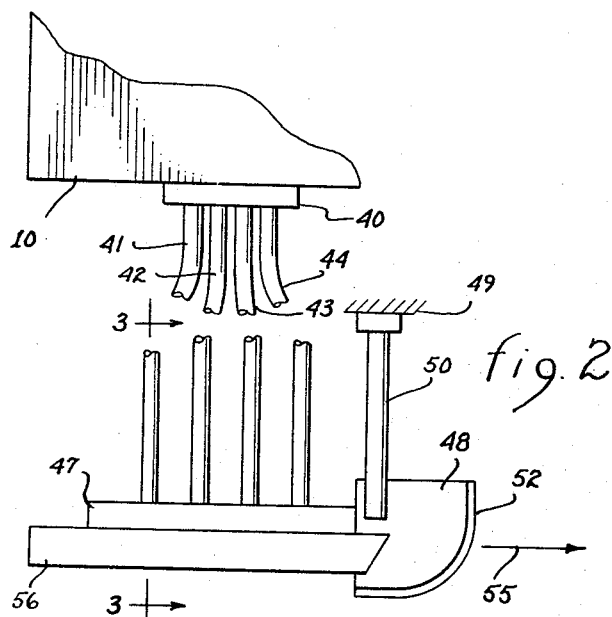
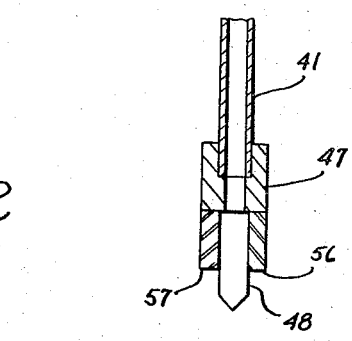
INVENTOR.
ROBERT L. PAUL
BY
*Drummond & Cahill*
ATTORNEYS Feb. 20, 1968  R. L. PAUL  3,369,702
PRECISION PLANTING DEVICE
Filed Nov. 2, 1966  5 Sheets-Sheet 2

INVENTOR.
ROBERT L. PAUL
BY
Drummond & Cahill
ATTORNEYS

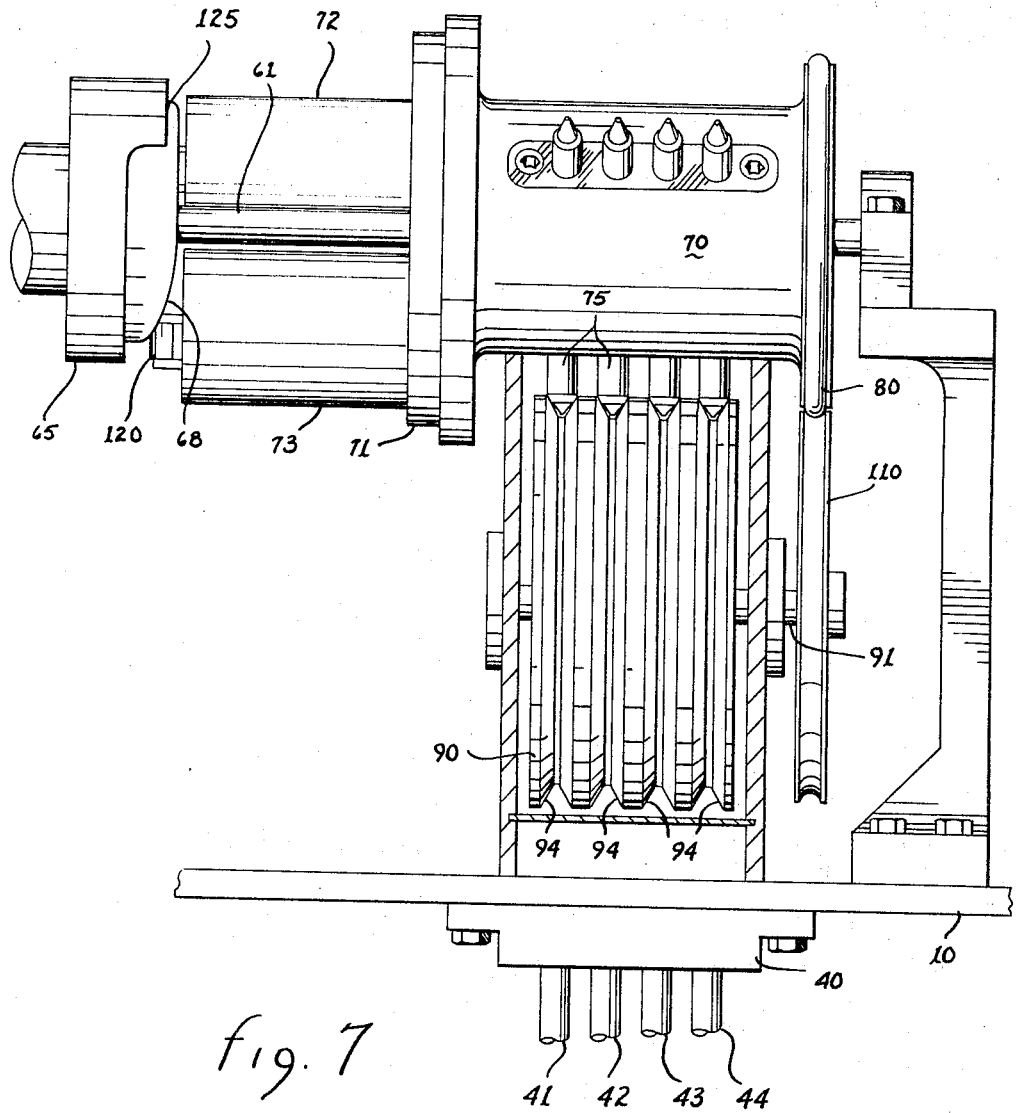

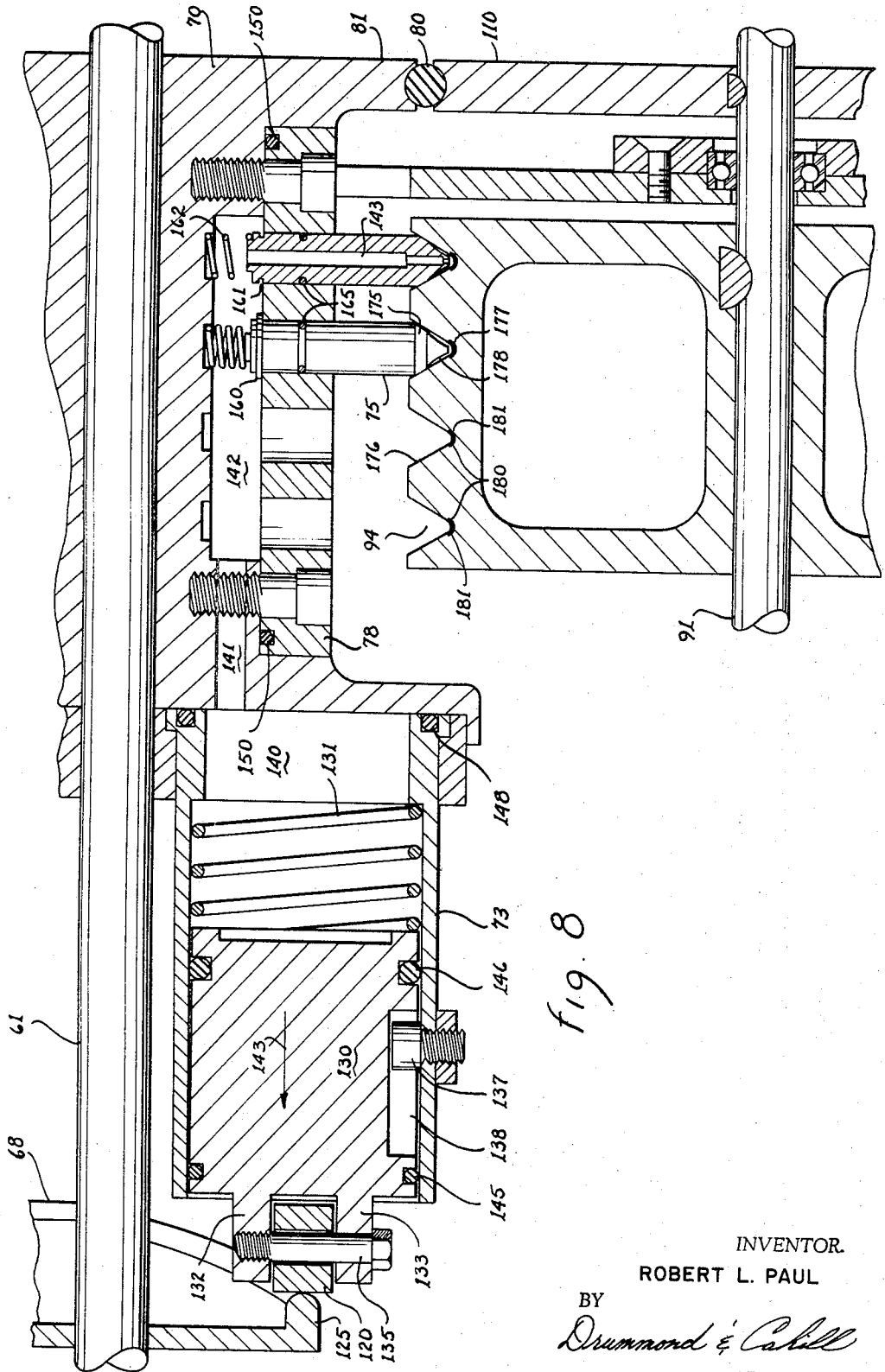

United States Patent Office 3,369,702
Patented Feb. 20, 1968

3,369,702
PRECISION PLANTING DEVICE
Robert L. Paul, 3701 W. Glendale Ave.,
Phoenix, Ariz. 85021
Filed Nov. 2, 1966, Ser. No. 596,041
11 Claims. (Cl. 221—211)

ABSTRACT OF THE DISCLOSURE

A planting device utilizing a seed alignment wheel having a plurality of circumferential V-shaped slots therein; the alignment wheel rotates within a seed bin and delivers seeds to pneumatic seed picks mounted on a hub to cause the picks to contact the seed alignment wheel and withdraw the individual seeds.

---

The present invention pertains to automatic planting devices, and more specifically, to a precision planting device intended to accurately position seeds.

Automatic machinery in the agricultural art has greatly enhanced the productivity of farm acreage and has also greatly enhanced the quality of the products. While modern machinery has made great advances in practically all phases of agriculture, there remains a specific area in which the available machinery has proven to be grossly inadequate. In certain types of crops wherein the seeds to be planted are exceedingly small, present machinery is unable to accurately position the seeds or successfully handle the seeds in the shield. For example, with the exception of the device of the present invention, no presently known machine can accurately and economically position seeds having a count of from 2500 to 30,000 seeds per ounce. Such extremely small seeds, such as the lettuce seed, have led to rather archaic methods of planting and cultivating.

The very size of the seeds militates against automatic handling and, as a result of the inefficiency of present machinery, it is the present practice to overplant to be certain to adequately cover the planted field. Gross overplanting results in obvious waste; for example, it is characteristic to plant from 325,000 to 575,000 lettuce seeds per acre, even though only 26,140 are needed for a 100 percent harvest. The result of this overplanting is the requirement for extensive culling of unwanted growth. The development of high percentage germination seeds substantialy reduces the necessity for overplanting and, even with low percentage yield germination, such gross overplanting is not only unnecessary but very undesirable. The culling may be accomplished either mechanically or by "stoop labor." Mechanical devices have not proved to be satisfactory since they are not selective to the particular plants being culled and are not sufficiently adaptable to provide the necessary thinning of the plants in a wide range of conditions. Stoop labor is becoming scarce, requires a long time, and is very expensive.

Overplanting using the methods today also results in the difficult problem presented by what are known as "doubles" (two plants very close with roots entangled so that hoeing of one damages the roots of the other, thus retarding its growth). However, even though culling one of a double means the retarding of the growth of the other, the culling must be performed to permit the remaining plant to attain full growth and maturity.

The prior art has tried to solve these problems by encapsulating seeds in a volcanic clay or by covering the seeds with a water soluble tape. The pre-processing necessitated by either of these methods greatly increases the cost of the seed and requires special handling equipment and special storage facilities. Further, the utilization of either of these methods renders it very difficult for the operator to change the type of seed being handled in the field (for example, the changing from an elongated seed in one field to a spherical seed in an adjoining field).

Perhaps one of the most telling reasons for the inability of the prior art to properly and precisely position seeds is that the planting devices of the prior art have characteristically been designed using very liberal tolerances; it has previously been thought that such liberal tolerances and designs are needed to suit the device for operation in extremely dirty atmospheres. However, such devices lack the ability to handle, with sufficient precision, extremely small seeds, and in combating the conditions under which the device must operate to provide the requisite reliability, prior art devices have fallen short of the requirements of a true precision planter.

It is therefore an object of the present invention to provide a precision planting device capable of handling extremely small seeds and precisely positioning the seeds.

It is another object of the present invention to provide a precision planting device that can economically plant extremely small seeds through its ability to properly position the seeds without excessive overplanting.

It is another object of the present invention to provide a precision planting device that will operate substantially more economically through the saving of seed as well as the elimination of a substantial portion of the necessary labor involved in culling unwanted growth.

It is a further object of the present invention to provide a precision plant device that will substantially eliminate the problem of doubles through the accurate and precise handling of individual seeds.

It is still another object of the present invention to provide a precision planting device that will accurately and precisely handle individual seeds without the necessity of encapsulating the seeds or otherwise treating the seeds or fixing the seeds to a positioning media such as a tape.

It is another object of the present invention to provide a precision planting device utilizing mechanisms operating with very close tolerances and nevertheless capable of withstanding the severe atmospheric conditions encountered in the dusty atmosphere and varying temperatures of field use.

These and other objects of the present invention will become apparent to those skilled in the art as the description thereof proceeds.

Briefly, in accordance with a specific embodiment chosen for illustration, the present invention contemplates the utilization of a unique seed alignment wheel in combination with a plurality of seed picks that grasp individual seeds and deposit the seeds in chutes to ultimately be delivered to the ground. The seed alignment wheel, in the embodiment chosen for illustration, comprises a rotating drum having a plurality of circumferential V-shaped slots therein. Each of the V-shaped slots includes an undercut at the base of the V with a rubber coating on the undercut. The seed alignment wheel rotates within a shroud, the latter forming a seed feed bin. A seed storage bin containing the seeds to be positoned, precedes the seed feed bin which, in turn, provides the seeds to the seed alignment wheel. As the seed alignment wheel rotates within its shroud, the individual seeds are forced upwardly by friction and are aligned with the grooves in the wheel. The weight of the individual seeds, the friction of the seeds with the V-shaped circumferential groove, and a rake positioned to "wipe" excess seeds from the wheel result in a series of aligned seeds being lifted from the seed feed bin or shroud upwardly.

A plurality of pneumatic seeds picks are mounted on a seed pick hub which, in turn, is mounted for rotation above the seed alignment wheel in such a manner that the seed picks contact the sides of the V-shaped groove of the seed alignment wheel. Each of the pneumatic seed picks includes an axial opening therein and each is retractable radially of the seed pick hub. The hub, in turn, is hollow and communicates with a vacuum/pressure producing device to thereby provide vacuum or positive pneumatic pressure to the tips of each of the seed picks at predetermined times. The seed pick hub is rotated in the opposite direction of the seed alignment wheel to the effect that as the seed picks contact the V-shaped grooves in the seed alignment wheel, the relative velocity between the seed pick tips and the V-shaped groove base is substantially zero. The contact between the picks and the V-shaped groove extends for approximately 20 degrees of travel of the seed alignment wheel and seed pick hub, during which time vacuum is applied to the tip of the seed pick to thereby enable it to attract and firmly grasp an individual seed. During this contact time, the seed pick is slightly retracted toward the seed pick hub through the force exerted by the V-shaped groove; however, the overall action of the 20 degree contact during the motion of the wheel and the hub results in a substantial zero velocity between the pick tip and the adjacent seed even though, theoretically, there may exist a slight rotational or "rocking" motion between the tip and the seed.

With vacuum applied to the seed pick tip, the seed is lifted from the V-shaped groove and carried upwardly by the pick. At a predetermined position in the upward travel of the pick, vacuum heretofore applied to the axial opening in the pick is quickly removed and a sharp positive pneumatic pressure is applied to "blow" or "pop" the seed from the pick tip and deposit it into a chute to be conveyed to the ground.

The entire device including the storage bin, the seed feed bin or shroud, the seed alignment wheel, and the seed pick hub with its extended seed picks, is enclosed in an air-tight compartment under slight positive pressure provided by a small blower providing filtered air to the interior thereof. The enclosure is vented to the atmosphere through the chutes to thereby provide a very gentle air flow to assist the seeds in their travel from the chute to the ground.

The present invention may now be described in detail with the aid of the following drawings in which:

FIGURE 1 is an isometric view of a precision seed planter constructed in accordance with the teachings of the present invention showing the manner in which such a device may be mounted on a vehicle for use in the field.

FIGURE 2 is an illustration of exit tubes for guiding seeds from the seed positioner to the ground and depositing same in a shallow furrow.

FIGURE 3 is a cross-sectional view of a portion of FIGURE 2 taken along line 3—3.

FIGURE 7 is a side elevational view, partly in section, of the device of FIGURES 4, 5 and 6.

FIGURE 8 is a partial side elevation in section of the device of FIGURE 7 that has been enlarged to more specifically show the interrelationship of various elements of the device.

Figure 4:
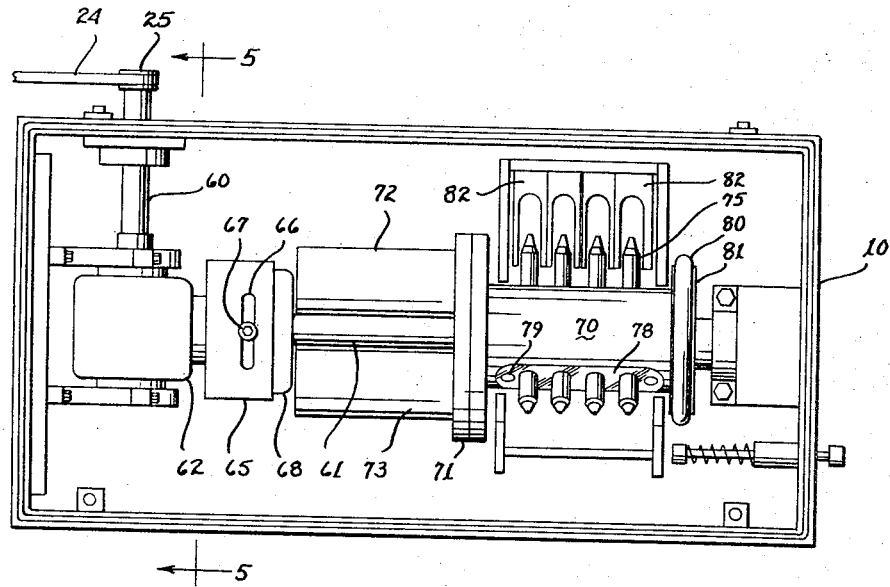
FIGURE 4 is a top view of a seed positioner constructed in accordance with the teachings of the present invention and having the seed storage bin removed.

Referring to FIGURE 1, the device of the present invention is shown schematically to merely illustrate the manner of its employment in the field. The seed positioner may be mounted within an air-tight box or enclosure 10 mounted on a framework 11, 12, 13, which in turns may either comprise the framework of a vehicle to be towed in the field or may comprise the framework of an actual tractive vehicle. A viewing window 14 is provided to permit visual inspection of the device without opening the enclosure 10. Power for the device may be provided from a power take-off on the tractive vehicle, by a separately energized electric motor, or most appropriately by ground driving through a pick wheel (not shown) or other well-known means for transmitting vehicle motion to rotary motion. Thus, motion is imparted to shaft 15, thereby driving a shaft 17 journaled in pillow blocks 18 and 19 by means of pulleys and V-belts 20 through 25. The enclosure 10 is air-tight and is provided with hinges such as the hinge 28 and closed to the atmosphere through the expediency of an appropriate gasket (not shown) and fastened shut through simple knurled screw devices 29. The air-tight enclosure 10 prevents dust and other atmospheric impurities from reaching the mechanism within; further, to insure that fine particles of dust and debris do not eventually find their way into the air-tight enclosure 10, an electrically driven blower (not shown in FIGURE 1) is mounted within the chamber 10 and is provided with an air filter 31 to filter air and provide the air to the inlet of the blower through conduit 38.

The mechanism mounted within the air-tight compartment 10 will be described later; however, to further the understanding of the device, reference will now be made to FIGURES 2 and 3 to explain the manner in which the seeds delivered from the air-tight enclosure 10 are delivered to the ground. Referring to FIGURE 2, the enclosure 10 is shown having a block 40 supporting a plurality of tubes 41, 42, 43, and 44 each of which extends from the bottom of the enclosure 10 into a supporting block 47 mounted on a furrow-digging device. The device shown in FIGURE 2 includes a plate 48 shown schematically supported from a frame member 49 by a supporting rod 50. The plate 48 includes a sharpened edge 52 on both the leading edge and bottom thereof. The tractive vehicle is moved in the direction shown in FIGURE 2 by the arrow 55 which results in the plate 48 riding on the ground with the sharpened edge 52 cutting a narrow and shallow furrow in the surface thereof. Skid bars 56 and 57 ride on top of the ground on either side of the furrow provided by the plate 48. As the seeds are expelled from the enclosure 10 through the respective tubes 41 through 44, they drop through the opening between the bars 56 and 57 into the furrow. Thus, as the device is being transported over the field, a shallow furrow is dug and the seeds are deposited therein at a predetermined interval. It may be noted that for purposes of simplification, a single air-tight enclosure 10 is shown and four tubes are shown extending therefrom to a single furrow. It will be obvious to those skilled in the art that the mechanism contained within the enclosure 10 may be duplicated to provide a series of enclosures each providing a desired number of seed outlets to thereby permit the planting of any desired number of rows at the same time. The device of the present invention has been designed so that it may be expanded modularly to accommodate a variety of desired configurations depending on the number of seed rows to be simultaneously planted as well as to accommodate the tyeps of soils, climatic conditions, etc.

Figure 5:
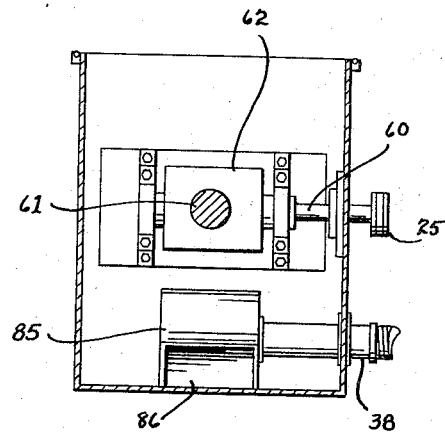
FIGURE 5 is a cross-sectional view of a portion of FIGURE 4 taken along line 5—5.

Referring now to FIGURES 4 and 5, it may be seen that the V-belt 24 driving the pulley 25 drives a shaft 60. The shaft 60, in turn, drives a shaft 61 through a right-angle drive contained in the mounting box 62 (the right-angle drive to transmit torque from the shaft 60 to the shaft 61 may be a simple bevel gear design and need not be shown in detail). The box 62 is fixed and does not rotate with the gear drive contained therein; a cam mounting plate 65 is secured to the enclosure 62 and thus is also maintained in a stationary condition. The plate 65 supports a camming surface 68 to be described in greater detail hereinafter. The camming surface 68 may be adjusted in its angular position about the shaft 61 through the utilization of a slot 66 in the mounting plate 65 and a locking nut 67 thereby permitting the camming plate to be secured in a desired angular position. The shaft 61 drives a seed pick hub 70 to which it is keyed. The hub 70 is secured to a cylinder mounting plate 71 having mounted thereon, in the embodiment chosen for illustration, three cylinders 72, 73 and 74 (cylinder 74 is behind the shaft 61 in FIGURE 4). A plurality of pneumatic seed picks 75 are mounted on the hub 70 and, in the embodiment chosen for illustration, are arranged in series of four. Each series of four seed picks are mounted in pick-holding blocks 78 which may conveniently be secured to the hub 70 through the utilization of simple machine screws 79.

The seed pick hub 70 also provides the driving means for the seed alignment wheel (not visible in FIGURES 4 and 5) through the utilization of a grommet 80 mounted over a grooved disk 81 formed in the end of the hub. The seed picks eject the seeds attracted thereto by blowing the seeds into chutes 82 each for catching a seed from a different one of the four picks coming into the seed ejection position. The chutes 82 are connected to the exit tubes shown in FIGURES 2 and 3.

Referring to FIGURE 5, the blower 85 may be seen and may be of any conventional low-pressure, air-blower design. In the device shown in FIGURE 5, the intake is provided by the conduit 38 connected, as shown in FIGURE 1, to an air filter. The exit to the centrifugal-type blower 85 is shown at 86 and merely empties into the interior of the enclosure 10 to provide a slight positive pressure therein.

Figure 6:
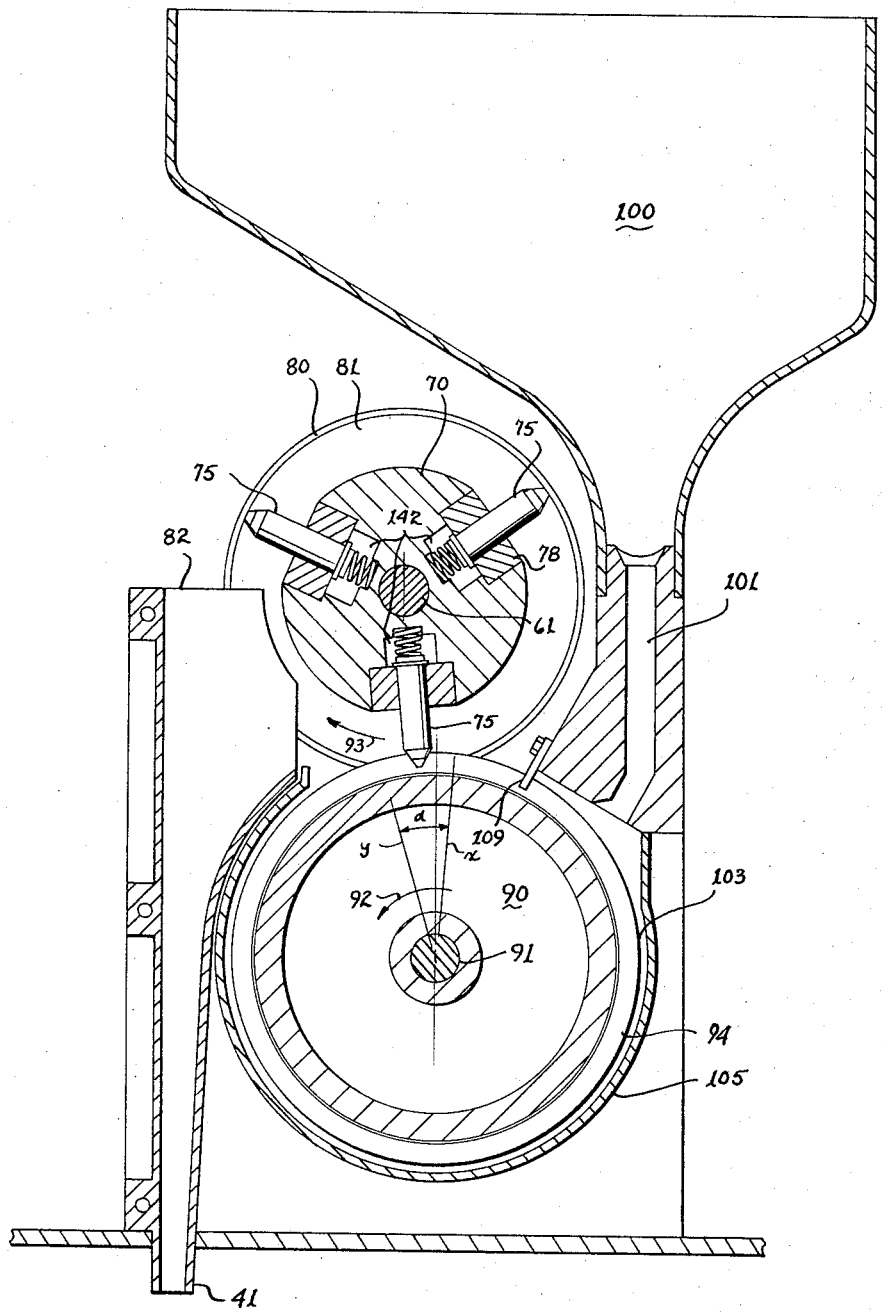
FIGURE 6 is an elevational view, in section, of a device constructed in accordance with the teachings of the present invention showing the interrelationship of the seed alignment wheel and the pneumatic seed picks.

Referring now to FIGURE 6, the seed pick hub 70 is shown in cross section with the seed pick mounting blocks 78 arranged at 120° intervals around the circumference thereof. The relationship of the seed pick 75 with the chutes 82, and the relationship of the chutes 82 with the exit tubes may more clearly be seen. A seed alignment wheel 90 is mounted for rotation about a shaft 91. The shaft 91 is parallel with the shaft 61; however, the center lines of the respective shafts are slightly offset (with respect to each other) from vertical as may clearly be seen in FIGURE 6. The seed alignment wheel 90 is driven by the seed pick hub through the expediency of the grommet 80 as will be explained more fully hereinafter. As the two rotate in the direction indicated by the arrows 92 and 93, the seed picks 75 come in contact with circumferential V-shaped grooves 94 provided in the circumference of the seed alignment wheel 90. There are four grooves 94 each corresponding to a pneumatic seed pick in each of the three groups of four seed picks. The specific interrelationship and operating functions of the seed picks in relation to the V-shaped grooves on the seed alignment wheel will be described more fully hereinafter.

A seed storage bin 100 is shown communicating through a passage 101 to the space 103 provided between the seed alignment wheel 90 and a metal shroud 105. The shroud, which may be termed a seed feed bin, receives seed from the storage bin 100 and holds the seed in contact with the surface of the seed alignment wheel. As the seed alignment wheel 90 rotates in the direction indicated, friction between the seeds and the wheel cause the seeds to be carried upwardly in a counterclockwise sense, as shown in FIGURE 6, toward the seed picks 75 as the latter contact the seed alignment wheel. A rake 109 is positioned "upstream" from the area of contact between the seed picks and the alignment wheel to rake off any excess seeds and prevent seeds from being presented to the seed picks jammed or several layers thick. The rake 109 also has the effect of "combing" the seeds in the grooves of the seed alignment wheel to further coerce the seeds to assume a position with the long axis thereof extending along the base of the V-shaped groove. When seeds of spherical shape are utilized, the rake 109 nevertheless provides a means for preventing jamming and thereby enhances reliability of the device.

Referring now to FIGURE 7, it may be seen that the seed alignment wheel 90 actually forms a drum having four circumferential V-shaped slots or grooves 94 therein. Each of these slots corresponds to one of the pneumatic seed picks 75 in each of the three groups of four picks mounted on the seed pick hub 70. The illustration in FIGURE 7 clearly indicates the manner in which the seed alignment wheel 90 is driven by the seed pick hub 70. The grommet 80 mounted on the grooved extension of the seed pick hub engages a similarly grooved plate 110 keyed to the shaft 91 rotating with the seed alignment wheel 90. The cylinder mounting plate 71, and the cylinders 72, 73 and 74 (behind shaft in FIG. 7) mounted thereon, rotate with the seed pick hub 70. Each of the cylinders includes a spring-loaded piston therein which is urged outwardly (to the left in FIG. 7) and is provided with a cam-following device comprising a roller such as the roller 120 secured to the piston. The cam follower 120 follows the surface of a cam 125 which is secured to the cam mounting plate 65 and prevented from rotating thereby. Thus, as the cylinders 72–74 rotate with the seed pick hub 70, their respective cam followers connected to the corresponding piston of each of the cylinders is forced inwardly of the cylinder or permitted to extend outward from the cylinder in accordance with the surface 68 of the cam 125. Since the cam 125 is rotatably secured to the cam mounting plate 65, and since the former is rotatably adjustable, it is possible to adjust the times for actuating or de-activating the respective cam followers and their connected pistons.

Referring now to FIGURE 8, the relationship of the cylinders, pistons, cam, with the pneumatic seed picks and seed alignment wheel may be described. The cylinder 73 contains piston 130 that is spring-urged outwardly (to the left in FIGURE 8) by the spring 131. The piston includes extensions 132 and 133 integral therewith for supporting a shaft 135 threaded at one end thereof. The shaft 135 rotatably supports the roller 120 that forms the cam follower. The cam 125 has a surface that undulates axially of the shaft 61; further, since the cam 125 does not rotate with the shaft 61, and since the cylinder 73, piston 130, and cam follower 120, do rotate with the shaft 61, the cam follower 120 is forced to follow the surface of the cam 125, resulting in axial movement of the piston within the cylinder. A stabilizing roller pin 137 extends into the cylinder 73 and engages a longitudinal mating notch 138 in the piston 130. The stabilizing roller pin prevents the piston from rotating about its axis and thereby stabilizes the orientation of the cam follower 120 with the cam surface 68.

The interior 140 of the cylinder 73 communicates through a channel 141 in the seed pick hub 70 with a chamber 142 also provided in the hub 70 and positioned beneath a set of four seed picks 75. The chamber 142 communicates with an axial opening 143 in each of the seed picks of the group of four seed picks. The provision of O-rings 145 and 146 on the piston 130, 148 on the cylinder end wall, and 150 extending around the periphery of the seed pick mounting block 78, assure that pressures existing in the cylinder space 140 are communicated to the seed pick tips through the channel 141, chamber 142, and axial passageway 143. Thus, when the cylinder 73 is rotated about the shaft 61, and the cam follower 120 engages a rising cam surface 125, the piston 130 is forced to the right as shown in FIGURE 8, thus increasing the pressure existing in the space 140. The increased pressure is communicated to the seed pick tips to thereby provide a slight blast of air to eject any seeds that may be adhering to the seed pick tip. Similarly, when the cam surface 125 recedes from the cam follower, the spring 131 forces the piston 130 to the left, thereby expanding the volume of the space 140 and rapidly decreasing its pressure; the decreased pressure is communicated as a partial vacuum to the tip of the corresponding seed picks. Any seeds that are in contact with the seed pick tips are thus drawn into intimate contact with the tips and held in that position until the partial vacuum is removed and pressure is applied.

Referring now to the details of the seed picks 75, it may be seen that the channel 143 extending axially therethrough is provided with varying diameters to assure proper tip exit diameter commensurate with the pressures and air flow expected. Each of the seed picks 75 is secured to the seed pick mounting block 78 through the expediency of a clip 160 positioned in a groove 161. A spring 162 urges each of the seed picks radially outwardly from the seed pick hub 70; thus, each of the picks is forced outwardly from the hub 70 until the clip 160 abuts the inner surface of the seed pick mounting block 78. O-rings 165 permit the seed picks to slide radially of the hub 70 without substantial air leakage. As the picks come in contact with the seed alignment wheel V-shaped slots 94, the picks are forced against the springs 162 and are thus retracted into the seed pick hub for a portion of the contact time and are then permitted to extend outwardly to their original position. The cause of the retraction and extension may best be described by reference again to FIGURE 6 where it may be seen that the pick 75 contacts the associated V-shaped slot in the seed alignment wheel at point $x$ and continues in contact with the seed alignment wheel to approximately the point $y$. The distance between the points $x$ and $y$ describes an arc of approximately 20 degrees illustrated in FIGURE 6 as the Greek letter $\alpha$. It will be obvious that during the period of contact between points $x$ and $y$, the seed pick will be forced radially inwardly of the seed pick hub.

Referring to FIGURE 8, each seed pick includes a camming surface 175 that forms the actual engaging surface with the seed alignment wheel by contacting the inside surface 176 of the V-shaped groove. The portion of the pick between the camming surface 175 and the pick tip 177 is formed with a slight concavity as shown at 178. This concavity prevents the crushing of seeds that may be trapped between the bottom of the V-shaped groove in the seed alignment wheel and the camming surface. It may be noted that while the distance between the bottom of the V-shaped groove in the seed alignment wheel and the tip of the seed picks may be critical; this particular dimension may be controlled with relative ease through the utilization of the camming surfaces 175 since the critical dimension is a relatively short distance between the camming surface and the tip rather than a less controllable distance, for example, as between the groove 161 and the tip 177. It may also be noted by reference to FIGURE 8 that the V-shaped slots 94 each contain an undercut 180 at the base of the V, said undercut being coated with a friction-increasing substance 181 such as rubber. The undercut with its coating provides a concave bottom to the V to further facilitate the alignment of elongated seeds so that the long axis of the elongated seeds coincide with the direction of travel and the axis of the V slots. Further, the friction-increasing coating or covering 181 adds to the ability of the seed alignment wheel to "lift" the seeds from the seed feed bin or shroud surrounding the seed alignment wheel to the vicinity of contact with the pneumatic seed picks.

The operation of the device may now be described as follows. The seed bin 100 is first filled with the seeds to be utilized and the enclosure 10 is sealed. The blower 85 is energized thus drawing air in through the filter 35 and conduit 38 to the interior of the enclosure 10. A slight positive pressure is thus provided and dust is prevented from entering the enclosure. Further, the slight positive pressure causes a gentle air flow through the chutes 82 into the corresponding seed tubes 41 through 44. As the planter is driven over the field, the motor 15 (or the power takeoff) is energized, thus causing the shaft 60 to be driven. The seed pick hub 70 is thus rotated which, in turn, drives the seed alignment wheel through the grommet 80. Seed from the seed storage bin 100 passes through the passageway 101 into the area 103 where it comes into contact with the seed alignment wheel 90. The wheel rotates in the direction indicated in FIGURE 6 such that the seed is forced upwardly against the pressure of the seed being introduced into the area 103 by the seed storage bin 100. The seeds thus being carried, by friction, upwardly and in a counterclockwise manner in reference to FIGURE 6 are "combed" or "raked" by a rake 109 that insures that jamming of seeds in the seed pick contact area will not occur. As the seeds pass over the top of the seed alignment wheel 90, and are not picked by the seed picks, they are passed again into the area 103 by the rotation of the seed alignment wheel.

As the seed pick hub rotates, each of the cylinders secured thereto also rotates about the shaft 61. Each cam follower 120 follows the surface 68 of the cam 125 thereby causing the pistons to extend outwardly (as indicated by the arrow 147 in FIGURE 8) or to be pushed inwardly of their corresponding cylinders. As a series of four seed picks approaches the point $x$ as shown in FIGURE 6, the corresponding cam follower reaches a sudden depression in the face of the cam 125 thereby permitting the spring within the cylinder to urge the piston outwardly thereof. The resulting partial vacuum is transmitted from the cylinder through the chamber 142 to the four seed picks communicating therewith. Thus, as the seed picks approach the point $x$, a vacuum is applied to the tips thereof and this vacuum remains throughout the contact time between the tip and the seed wheel. During the contact period of the seed pick with the corresponding groove of the seed wheel, the seed pick tip is held at a relative velocity of substantially zero with respect to the seed being carried in the groove of the seed alignment wheel. Thus, the seed pick tip with a vacuum being applied thereto remains in close proximity to, or in substantial contact with, the seed being carried by the seed alignment wheel for the time it takes for the seed alignment wheel or seed pick hub to travel 20 degrees (the distance between points $x$ and $y$). The distance from the tip of the seed pick to the seed remains substantially constant since the seed pick camming surface engages the inside surface of the V-shaped groove and is maintained in contact through the expediency of the radial movement of the seed pick in relation to the seed pick hub. The seed thus carried by the seed alignment wheel to the seed pick contact area is attracted by vacuum to the seed pick and is carried upwardly and away from the seed alignment wheel to a position opposite seed chutes 82. At this time, the cam follower engages an abrupt shoulder in the cam surface thus causing a sharp movement of the piston into the corresponding cylinder to give rise to a sudden increase in pressure applied to the tip of the seed pick. The sudden increase in pressure results in the emphatic release of the seed and throwing of the seed into the chute 82 asociated wtih each seed pick. The seed, thus thrown into the chute, falls by gravity through the chute into the seed tube and ultimately outward and downward to the shallow furror provided in the ground as described above. The travel of the seed in the chute and in the tube is further facilitated by the gentle flow of air caused by the positive pressure existing in the enclosure 10.

The number of seed picks in each group of seed picks (four in the embodiment chosen for illustration) as well as the number of series or groups of seed picks spaced about the seed pick hub may be varied greatly. The spacing of the seeds on the ground may be varied greatly by varying the speed of rotation of the seed pick hub or the ratio of the speed of the tractive vehicle with the speed of the above-described mechanism, or even by the spacing of the seed tubes as they exit to the ground. It will also be obvious to those skilled in the art that a great many modifications may be made in the materials and size of the various components described herein; for example, the present device may be expanded to accommodate practically any number of seed picks to expedite planting of large areas through the utilization of simultaneous planting of many rows. The modularization mentioned previously facilitates the expansion of the embodiment chosen for illustration into a system for simultaneously planting a large number of rows. It is therefore obvious to those skilled in the art that many modifications may be made in the system of the present invention without departing from the spirit and scope thereof; it is therefore intended that the present invention be limited only by the scope of the claims appended hereto.

I claim:

1. In a precision planting device, the combination comprising: a seed pick hub mounted for rotation about an axis; a plurality of pneumatic seed picks mounted on said seed pick hub and extending therefrom; a seed alignment wheel rotatably mounted in a seed feed bin, said wheel having a circumferential groove therein for frictionally engaging seeds in said bin to lift seeds upwardly toward said seed picks; said seed pick hub positioned relative to said seed alignment wheel to cause said seed picks to engage the circumferential groove in said seed alignment wheel when the hub is rotated; said hub and said wheel driven relative to each other to provide substantially zero relative velocity between one of said seed picks and said wheel when said one seed pick contacts said circumferential groove.

2. The combination set forth in claim 1 wherein each of said plurality of said pneumatic seed picks are retractable toward said hub and wherein each is resiliently urged to an extended position.

3. The combination set forth in claim 1 wherein each pick is retractable toward said hub and is resiliently urged to an extended position, and wherein each of said picks are retracted by the force of the contact between said wheel and the picks.

4. The combination set forth in claim 1 wherein said circumferential groove is a V-shaped groove having a concave undercut at the base of the V to provide improved seed alignment as the wheel rotates.

5. The combination set forth in claim 1 wherein each of said pneumatic seed picks is provided with an axial opening therein communicating with a hollow interior provided in the seed pick hub to permit the application of vacuum to the seed pick tips.

6. In a precision planting device, the combination comprising: a seed pick hub mounted for rotation about an axis; a plurality of pneumatic seed picks mounted on said seed pick hub and extending therefrom; a seed alignment wheel rotatably mounted in a seed feed bin, said wheel having a circumferential groove therein for frictionally engaging seeds in said bin to lift seeds upwardly toward said seed picks; said seed pick hub positioned above and relative to said alignment wheel to cause said seed picks to engage the circumferential groove in said seed alignment wheel when the hub is rotated; said hub and said wheel driven relative to each other to provide substantially zero relative velocity between one of said seed picks and said wheel when said one seed pick contacts said circumferential grooves; and fluid actuating means for applying a vacuum to the tips of said seed picks when said picks contact said groove.

7. The combination set forth in claim 6 wherein each of said plurality of pneumatic seed picks are retractable toward said hub and wherein each is resiliently urged to an extended position.

8. The combination set forth in claim 6 wherein each pick is retractable toward said hub and is resiliently urged to an extended position, and wherein each of said picks are retracted by the force of the contact between said wheel and the picks.

9. The combination set forth in claim 6 wherein said circumferential groove is a V-shaped groove having a concave undercut at the base of the V to provide improved seed alignment as the wheel rotates.

10. The combination set forth in claim 6 wherein each of said pneumatic seed picks is provided with an axial opening therein communicating with a hollow interior provided in the seed pick hub to permit the application of vacuum to the seed pick tips.

11. In a precision planting device, the combination comprising: a hollow seed pick hub mounted for rotation about an axis; a plurality of pneumatic seed picks mounted on said seed pick hub and extending therefrom, each pick having an axial opening therein communicating with the hollow interior of said seed pick hub; each pneumatic seed pick having a tapered camming surface for engaging the sides of a V-shaped groove and each being retractable toward said hub, means for resiliently urging each of said picks to an extended position; a seed alignment wheel rotatably mounted in a seed feed bin, said wheel having a V-shaped circumferential groove therein for frictionally engaging seeds in said bin to lift seeds upwardly toward said seed picks, said V-shaped groove having a concave undercut at the base of the V, said undercut being coated with a friction-increasing substance; said seed pick hub positioned above and relative to said seed alignment wheel to cause the camming surface of said seed picks to engage the sides of the V-shaped groove in said seed alignment wheel when the hub is rotated, said picks being retracted by the force of the contact between said wheel and said picks; said hub and said wheel driven relative to each other to provide substantially zero relative velocity between one of said seed picks and said seed wheel when said one seed pick contacts said circumferential groove; fluid actuating means for applying a vacuum to the tips of said seed picks when said picks contact said groove, said fluid actuating means also applying a positive pneumatic pressure to said tips at a predetermined time to discharge seeds adhering to said picks.

References Cited

UNITED STATES PATENTS

| 3,038,637 | 6/1962 | Zakrzewski et al. | 221—278 X |
| 3,039,531 | 6/1962 | Scott | 221—278 X |
| 3,240,175 | 3/1966 | Clow | 221—211 X |

FOREIGN PATENTS

| 638,193 | 5/1950 | Great Britain. |

SAMUEL F. COLEMAN, *Primary Examiner.*